Figure 1:
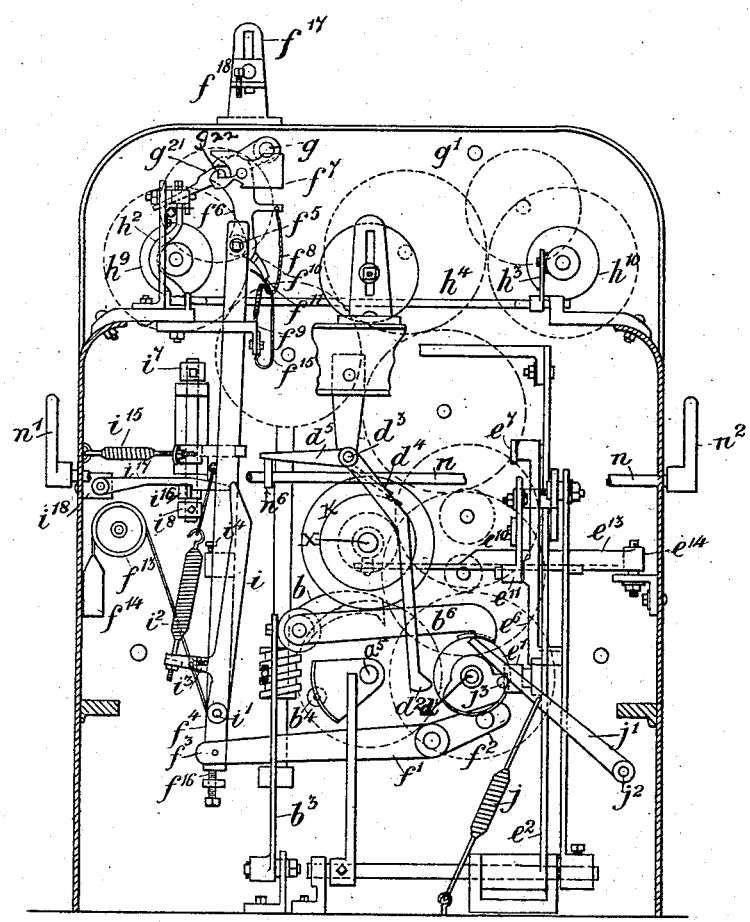

(No Model.) 8 Sheets—Sheet 1.

T. & J. SEED.
PROCESS OF SPINNING AND DOUBLING COPS OF COTTON.

No. 524,912. Patented Aug. 21, 1894.

Witnesses
George Baumann
S. C. Connor

Inventors
Thomas Seed
James Seed
By their Attorney
Howson and Howson (No Model.) 8 Sheets—Sheet 2.
T. & J. SEED.
PROCESS OF SPINNING AND DOUBLING COPS OF COTTON.

No. 524,912. Patented Aug. 21, 1894.

(No Model.)  
8 Sheets—Sheet 3.
T. & J. SEED.
PROCESS OF SPINNING AND DOUBLING COPS OF COTTON.
No. 524,912. Patented Aug. 21, 1894.
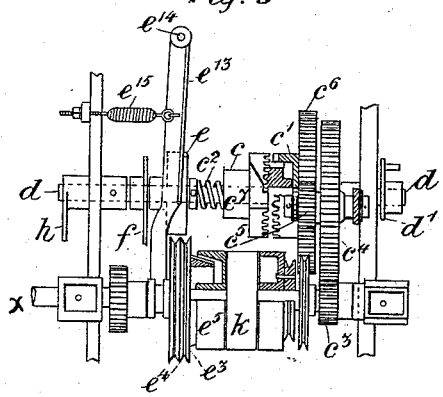
Fig. 3
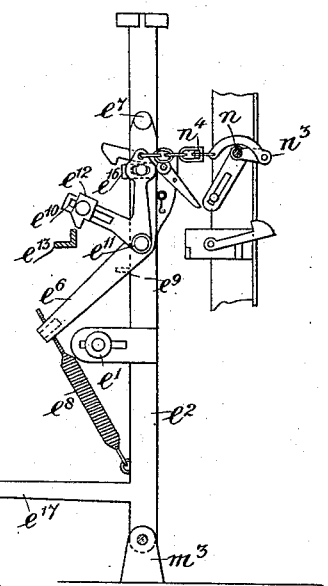
Fig. 4.
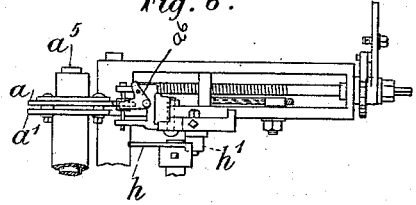
Fig. 5.
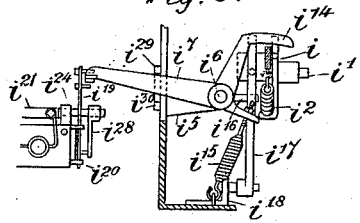
Fig. 6.
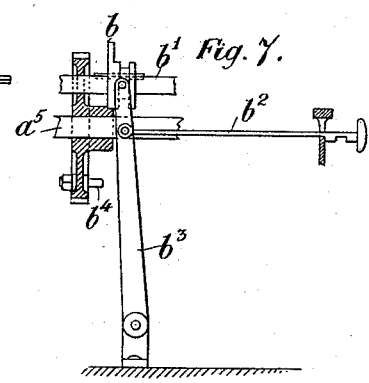
Fig. 7.
Fig. 8.
Witnesses:  
George Baumann  
J. C. Connor
Inventors  
Thomas Seed  
James Seed  
By their Attorneys  
Howson and Howson (No Model.) 8 Sheets—Sheet 4.
T. & J. SEED.
PROCESS OF SPINNING AND DOUBLING COPS OF COTTON.
No. 524,912. Patented Aug. 21, 1894.
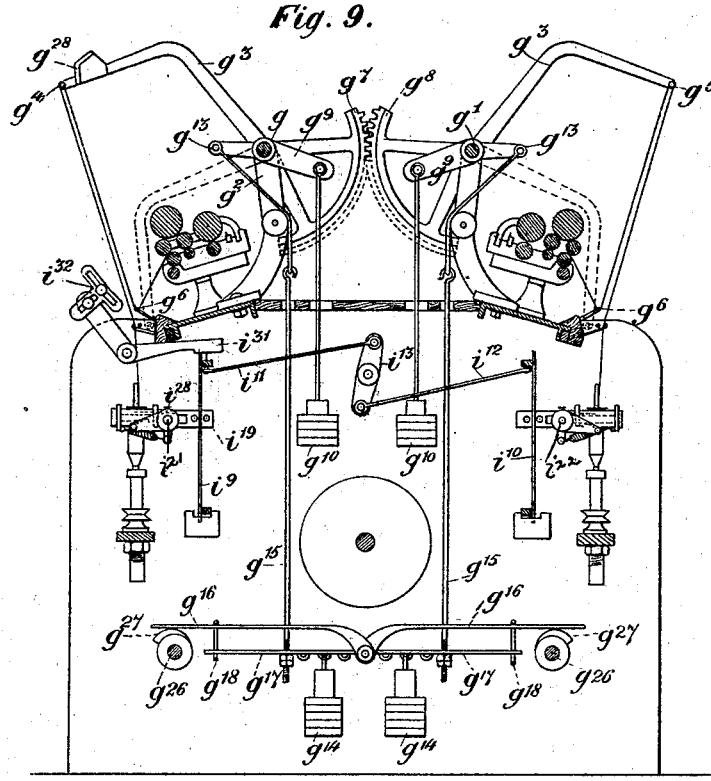
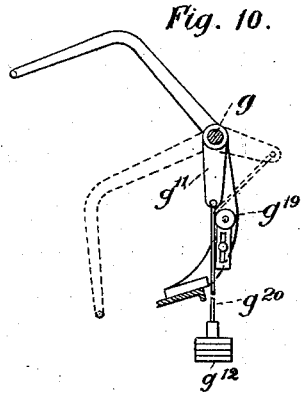
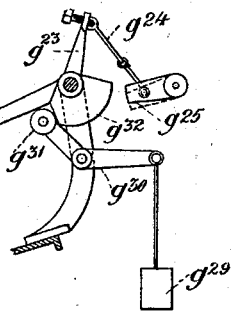
Witnesses:
George Baumann
Inventors
Thomas Seed
James Seed
By their Attorney
Howson and Howson (No Model.)
8 Sheets—Sheet 5.

T. & J. SEED.
PROCESS OF SPINNING AND DOUBLING COPS OF COTTON.

No. 524,912.
Patented Aug. 21, 1894.

Witnesses
George Baumann
J. C. Connor

Inventors
Thomas Seed
James Seed
By their Attorneys
Howson and Howson (No Model.)  T. & J. SEED.  8 Sheets—Sheet 6.
PROCESS OF SPINNING AND DOUBLING COPS OF COTTON.
No. 524,912.  Patented Aug. 21, 1894.

(No Model.) 8 Sheets—Sheet 7.

T. & J. SEED.
PROCESS OF SPINNING AND DOUBLING COPS OF COTTON.

No. 524,912. Patented Aug. 21, 1894.

Witnesses
George Baumann
J. C. Connor

Inventors
Thomas Seed
James Seed
By their Attorneys
Howson and Howson (No Model.) 8 Sheets—Sheet 8.

T. & J. SEED.
PROCESS OF SPINNING AND DOUBLING COPS OF COTTON.

No. 524,912. Patented Aug. 21, 1894.

UNITED STATES PATENT OFFICE.

THOMAS SEED AND JAMES SEED, OF PRESTON, ENGLAND.

PROCESS OF SPINNING AND DOUBLING COPS OF COTTON.

SPECIFICATION forming part of Letters Patent No. 524,912, dated August 21, 1894.

Application filed July 25, 1893. Serial No. 481,401. (No model.) Patented in England August 11, 1892, No. 14,503.

*To all whom it may concern:*

Be it known that we, THOMAS SEED and JAMES SEED, subjects of the Queen of Great Britain and Ireland, and both of Preston, in the county of Lancaster, England, the former residing at present in Moscow, Russia, have invented an Improved Process of Spinning and Doubling Cops of Cotton or other Fibrous Materials and Apparatus to be Employed Therefor, (for which we have obtained British Patent No. 14,503, dated August 11, 1892,) of which the following is a specification.

This invention relates to an improved process of spinning and doubling cotton and other fibrous materials and winding the yarn or thread so spun or doubled on to bare spindles or small tubes in the form of cops by the ring and traveler as hereinafter described and claimed.

It is found impracticable to use the ordinary ring and traveler system of spinning for forming cops on the bare spindle, owing to the great number of breakages of the yarn or thread which occur while forming the nose of the cop on the small diameter of the upper part of the spindle.

The main features of the three principal parts of the improved process may be described as follows and for convenience of future reference we will call them first, second and third parts of the improved process.

The first part of the improved process consists in using the ring and traveler system of spinning or doubling at the commencement of the formation of the cops and until they have attained a suitable size.

The second part of the improved process (continuing the formation of the cops) consists in causing the simultaneous spinning (or doubling) and winding on of the yarn or thread by the ring and traveler to be effected at and near the middle and larger diameters of the chase of the cops, and also to put on an additional quantity of yarn or thread at the larger diameters of the chase of the cops.

The third part of the improved process consists in forming the upper or smaller parts of the chase of the cops by unwinding or stripping the above mentioned additional quantity of yarn or thread from the lower part of the chase of the cops and winding it positively (that is without any rotation of the traveler) on the upper or smaller parts of the chase of the cops.

The second and third parts of the improved process are used alternately for each layer of yarn or thread added to the whole chase of the cops, after the completion of the first part of the improved process; each successive layer being built higher up the spindle until the cops are completed.

In order that our invention may be clearly understood we will now describe the various operations of our improved process in the order that they are brought into action from the commencement of the formation of a set of cops to the finish, and have shown and described the means we use for practically effecting the same and which we call the new spinning frame, reference being made to the drawings hereunto annexed and marked with letters of reference corresponding with those in the following explanation thereof.

Figure 2:
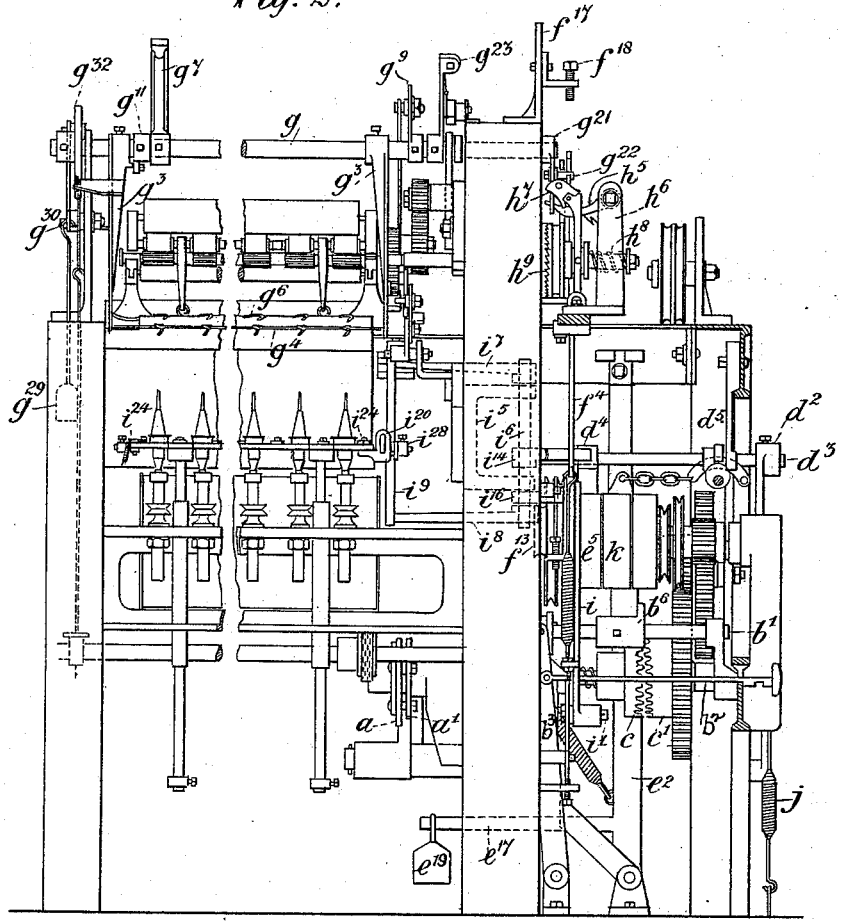
Figure 12:
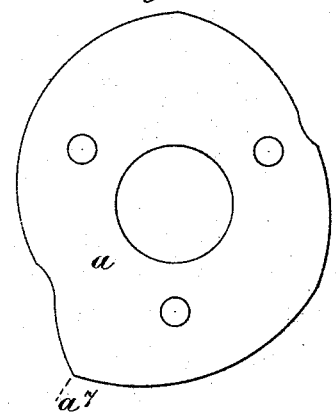
Figure 13:
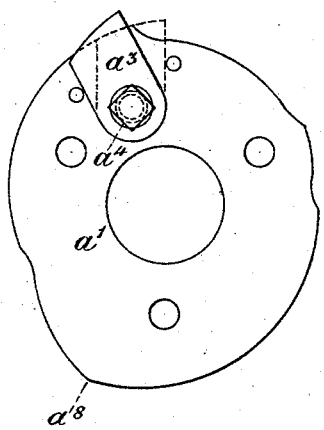
Figure 14:
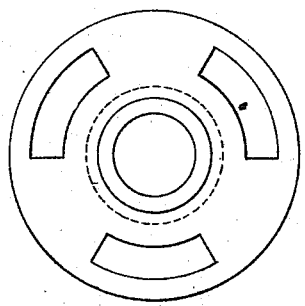
Figure 15:
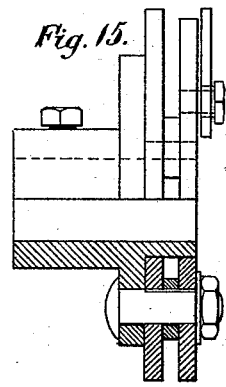
Figure 16:
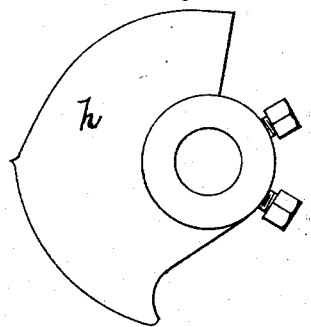
Figure 17:
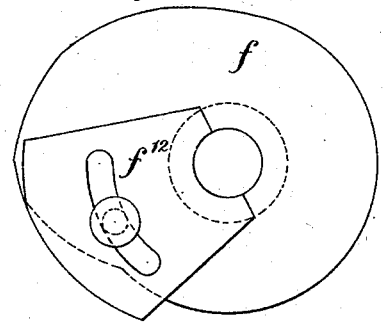
Figure 18:
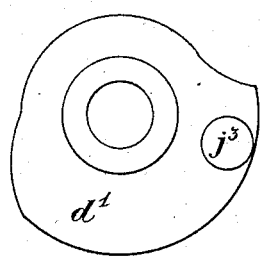
Figure 19:
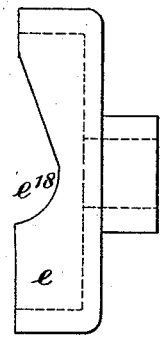
Figure 20:
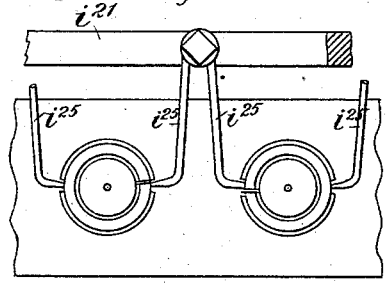
Figure 21:
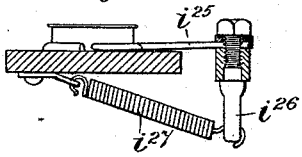
Figure 22:
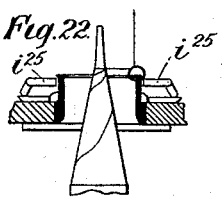
Figure 23:
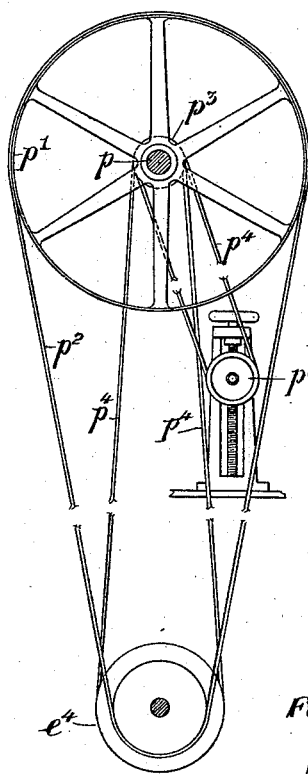
Figure 31:
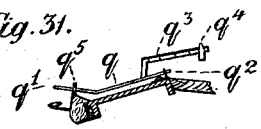
Figure 32:
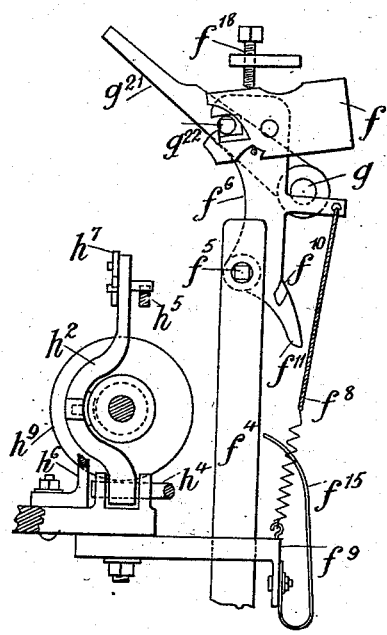
Figure 33:
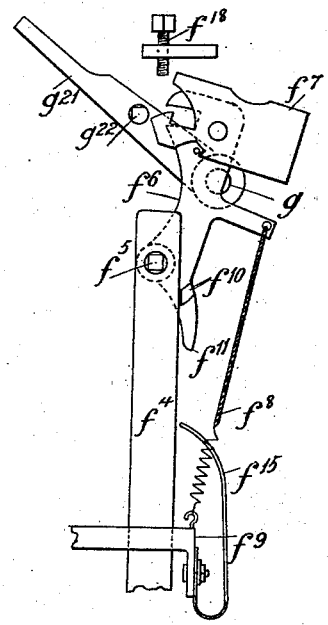
Figure 34:
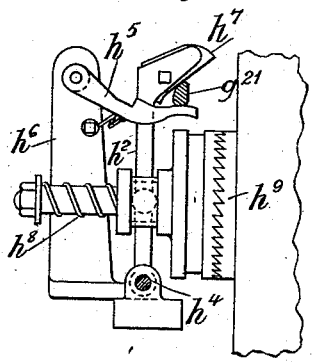
Figure 35:
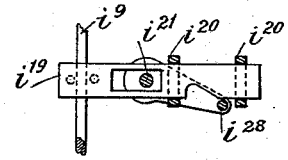

Figure 1 is an elevation of the gearing end of the new spinning frame with part of the framing and a little of the mechanism cut away; the toothed wheels are indicated by centers and dotted pitch lines. Fig. 2 is a side elevation of the new spinning frame with part of the framing, &c., cut away. Fig. 3 is a plan of the part of the cylinder shaft with the driving pulleys and wheels thereon, and the cam shaft and parts connected thereto, showing some parts in section. Fig. 4 is a side elevation of strap fork lever, and mechanism connected to it. Fig. 5 is a side elevation of builder lever and hearts or builder cams; and Fig. 6 is a plan of same. Fig. 7 is a side elevation of mechanism for moving lever $b$ in or out of action. Fig. 8 is a plan of the mechanism for locking the travelers. Fig. 9 is a transverse section through the rollers of the new spinning frame. Figs. 10 and 11 are end elevations of mechanism applied to the faller shafts. Figs. 12 and 13 show the shape of first and second hearts or cams $a$ $a'$ respectively. Fig. 14 shows the boss and disk to which the hearts or cams $a$ $a'$ are attached. Fig. 15 is a side elevation showing part in section of boss and disk with hearts or cams $a$ $a'$ attached. Fig. 16 shows the shape of the third heart or cam $h$; Fig. 17 the stripping cam $f$ and Fig. 18, Sheet 6, the brake cam $d'$. Fig. 19 is a side elevation of the circular strap fork cam $e$. Fig. 20 is a plan of part of the ring rail. Fig. 21 is a transverse section of the ring rail showing the projections $i^{25}$ out of action. Fig. 22 is a side elevation of ring and ring rail in section and showing the position of projections $i^{25}$ when stopping the travelers. Fig. 23 is an elevation of the driving arrangement for the new spinning frame. Figs. 24 to 30 are elevations of the cop chase and show the distribution of the yarn or thread on the same. Fig. 31 is a side elevation of an indicator shown in position on the roller beam. Fig. 32 is an end elevation showing the position of the faller unlocking mechanism previous to the connecting link $f^6$ being disengaged from stud $g^{22}$, and also roller clutch mechanism with part in section and part cut away. Fig. 33 is an end elevation showing the position of the faller unlocking mechanism just after the connecting link $f^6$ has been disengaged from the stud $g^{22}$. Fig. 34 is a side elevation of roller clutch and mechanism for operating the same; part in section as seen from opposite side to that shown in Fig. 2, Sheet 2. Fig. 35 is an end elevation of slide bar $i^{19}$ showing the incline cut in the same as seen from the end opposite to that shown in Fig. 9, Sheet 4.

The first part of the improved process and means for effecting the same consists in using at the commencement of the formation of the cops the ordinary ring and traveler system of spinning with the ring frame using suitable sized ring spindles, and a heart or cam $a$ to give the requisite traverse of the ring rail, building the yarn or thread on to the bare spindles or small tubes and continuing in operation until the cops have attained a suitable size.

The second part of the improved process is brought into action after the following changes have been made by the attendant:— The bowl $a^2$ is moved from heart $a$ to heart $a'$ by a lever and fork $a^6$ and is fixed in each position by a pin passing through the lever $a^6$ and entering a hole in the bearing supporting the bowl $a^2$ (see Figs. 5 and 6); and the lever $b$ (see Figs. 1 and 7) connected to shaft $b'$ by a key is slid on the shaft $b'$ by the rod $b^2$ and lever $b^3$ so that the stud $b^4$ may engage with lever $b$ at the required moment.

The second part of the improved process and means for effecting the same is now brought into operation and consists in using the heart $a'$ to actuate the ring rail which is so shaped as to cause the simultaneous spinning and winding by the ring and traveler to take place at and near the middle and large diameters of the chase of the cops, and to build an additional quantity of yarn or thread on the larger diameters of the chase of the cops.

The third part of the improved process and means for effecting the same is now brought into action by the stud $b^4$ lifting the lever $b$ which through shaft $b'$ lifts the lever $b^6$ and allows the sliding clutch $c$ to be thrown into gear with the revolving part of the clutch $c'$, by spring $c^2$ (see Fig. 3) which had been previously compressed. The sliding clutch $c$ is connected by a dog and disk to cam shaft $d$. The clutch $c'$ receives its motion from the cylinder shaft by the pinion $c^3$ fast on the cylinder shaft gearing into $c^4$, and pinion $c^5$ attached to $c^4$ driving $c^6$ which is attached to $c'$ and loose on the cam shaft $d$. The two parts of the clutch $c c'$ being now in gear cause the cam shaft $d$ to commence to revolve. The speed of the spinning frame now requires reducing quickly. This is effected by two cams on the cam shaft $d$ (see Figs. 1, 2, and 3) viz: the brake cam $d'$ acting on the lever $d^2$ attached to the shaft $d^3$ pressing the lever $d^4$ against the fast pulley $e^5$ on the cylinder shaft for a short time; and the strap fork cam $e$ acts, through the bowl $e'$ (see also Fig. 4) on the strap fork lever $e^2$ causing the driving strap to be moved from the fast pulley $e^5$ to the loose pulley $k$. The same motion of the strap fork lever $e^2$ causes the friction clutch $e^3$ (loose on the cylinder shaft driven at a suitable speed for winding by grooved pulley $e^4$ attached to it) to engage with the cone formed on the inside of the fast pulley $e^5$ thus retarding and then driving the spinning frame at a suitable winding speed. The connections which cause the friction clutch $e^3$ to engage with $e^5$ are the lever $e^6$ supported on lever $e^2$ at the center $e^7$. The spring $e^8$ forces the stop $e^9$ on lever $e^6$ against lever $e^2$; the bell cranked lever $e^{10}$ is supported at center $e^{11}$. When the strap is on the fast pulley $e^5$, the catch $e^{12}$ is engaged with the lever $e^{13}$ having its center at $e^{14}$ and its other end engaging in a groove in the boss of friction clutch $e^3$. The pressure exerted on the friction clutch is regulated by the strength of the spring $e^8$; $e^{15}$ is a spring to keep the friction clutch out of action. The frame is thus retarded and then driven at a suitable speed for winding.

The next operation consists in unwinding or stripping from the cops the additional quantity of yarn or thread which was built on the larger diameters of the chase of the cops as above stated. The stripping cam $f$ now comes into action acting on the lever $f'$. It depresses the end $f^2$. The end $f^3$ is jointed to the slide bar $f^4$. At the upper end of $f^4$ a stud $f^5$ is fixed and on this stud there is the connecting link $f^6$ and on $f^6$ there is the faller unlocking catch $f^7$ (see also Fig. 32). Two faller shafts $g$ and $g'$ (see Figs. 2 and 9) extend the length of the spinning frame supported by suitable bearings $g^2$. Arms $g^3$ are attached to these shafts $g\ g'$ and these arms support two wires $g^4$ and $g^5$ one on each side placed beneath the yarn and above the guide eyes. Hooks $g^6$ are fixed above the wire under which the yarn passes from the rollers to the guide eyes. The faller shafts are connected by segments $g^7$ and $g^8$ and suitably balanced by levers $g^9$ supporting weights $g^{10}$, and winding balance weight levers $g^{11}$ and weights $g^{12}$ supported by cord $g^{20}$ working over pulley $g^{19}$ (see Fig. 10), and relieving weight lever $g^{13}$ and weights $g^{14}$ supported by the rod and cord $g^{15}$ through the levers $g^{16}$ and $g^{17}$ and links $g^{18}$. A number of these levers and weights are placed at intervals on the faller shafts to suitably balance and weight them. On the faller shaft $g$ there is fixed the lever $g^{21}$ having stud $g^{22}$ fixed to it (see Figs. 1 and 2) and the connecting link $f^6$ engages with stud $g^{22}$.

An upward motion is given to lever $g^{21}$ from $f^4$ through link $f^6$ and stud $g^{22}$. The first motion of the lever $g^{21}$ causes the roller clutches $h^9$, $h^{10}$, to be thrown out of gear through the end of lever $g^{21}$ acting on an incline at the end of lever $h^2$ (see Fig. 1) which is connected by shaft $h^4$ to lever $h^3$. The two levers $h^2$, $h^3$ are connected by swivel dies to the two sliding clutches $h^9$ and $h^{10}$. These clutches are now kept out of gear by a catch $h^5$ supported on a bracket $h^6$, engaging with a lug on lever $h^2$ (see Fig. 34). The faller wires rising bear against the yarn, or thread and deflect it into the form of a long loop as shown in Fig. 9 and thereby unwind or strip the additional quantity of yarn or thread off the cops by causing the travelers to rotate quicker than the spindles. The fallers are now unlocked or disconnected from the link $f^6$. During the upward motion of $f^6$ the cord and spring $f^8$ having one end fastened to $f^6$ and the other to the bracket $f^9$ have been stretched. The fallers are disconnected from link $f^6$ by the screw $f^{18}$ supported on bracket $f^{17}$ depressing the catch $f^7$ until it is clear of the stud $g^{22}$ (see Figs. 32 and 33). This allows the spring $f^8$ to disconnect the link $f^6$ from the stud $g^{22}$; a little before this the faller stops $g^{23}$ (see Fig. 11) come in contact with the friction stops $g^{25}$. These stops of which there are several placed along the faller shafts are used to control the height to which the faller wires ascend by their momentum. Weights $g^{14}$ which we call the relieving weights having been raised by lever $g^{13}$ and $g^{17}$ now act for a short time on the faller shafts causing the faller wires to commence descending. The amount of fall these relieving weights are allowed to have is gradually lessened until the completion of the cops. This is effected by allowing the weights to fall on to supports $g^{16}$, and $g^{18}$, the levers $g^{16}$ being gradually raised by cams $g^{27}$ on the block shafts $g^{26}$.

During the operation of stripping the third heart or cam $h$ fixed on the cam shaft $d$ causes the ring rail to be gradually raised by acting on the builder lever through the bowl $h'$ (see Figs. 5 and 6).

The next operation consists in winding the yarn of thread which has been taken off the cops, positively on the upper part of the chase of the cops. On the slide bar $f^4$ (see Figs. 1, 2, 8, and 9) the lever $i$ is supported by the stud $i'$. The spring $i^2$ has one end attached to the slide bar $f^4$ and the other to a projection from lever $i$ and being stretched forces the stop $i^3$ on lever $i$ against the slide bar $f^4$, $i^4$ is a set screw supported by a bracket fixed to the slide bar $f^4$. The bracket $i^5$ attached to the framing supports shaft $i^6$. Fixed on the shaft $i^6$ are the two arms $i^7$ and $i^8$ to which is attached the bar $i^9$. The bar $i^{10}$ is also supported by bracket, shaft, and arms, and is connected to $i^9$ by rods $i^{11}$, $i^{12}$, and lever $i^{13}$ supported on a stud fixed to the framing. On the shaft $i^6$ the lever $i^{14}$ is fixed. The spring $i^{15}$ has one end attached to lever $i^{14}$ and the other to the framing; fixed to the shaft $i^6$ is the lever $i^{16}$ with which the catch $i^{17}$ supported by stud and bracket $i^{18}$ fixed to the framing engages; the slide bar $i^{19}$ is supported by bearings $i^{20}$ attached to the ring rail. Two pins are fixed in slide bar $i^{19}$ placed one on each side of bar $i^9$; in the slide bar $i^{19}$ there is an incline cut, (see Fig. 35). A similar slide bar and bearings are placed on the ring rail on the other side of the frame. The shafts $i^{21}$ and $i^{22}$ are supported on suitable bearings $i^{24}$ attached to the ring rail. To these shafts are fixed the projections $i^{25}$ one or more for each ring. To the projection $i^{26}$ fixed to the shaft $i^{21}$ (see Fig. 21) one end of the spring $i^{27}$ is attached, the other being attached to the ring rail. This set of mechanism is brought into action in the following way:— The slide $f^4$ rising forces the incline on the upper end of the lever $i$ against the lever $i^{14}$. As the lever $i^{14}$ is prevented from moving by the lever $i^{16}$ and catch $i^{17}$ the lever $i$ is moved sidewise so that the pressure of the spring $i^2$ is exerted through the lever $i$ on the lever $i^{14}$. By the upward motion of the slide bar $f^4$ the set screw $i^4$ lifts the catch $i^{17}$ thereby liberating the lever $i^{16}$, the spring $i^2$ being stronger than the spring $i^{15}$ forces the bar $i^9$ forward moving the arm $i^3$ from the stop $i^{29}$ against the stop $i^{30}$. The catch $i^{31}$ (see Fig. 9) now drops over a projection on arm $i^7$ and retains the bar $i^9$ in this last position. This forward motion of the bar $i^9$ moves the slide bar $i^{19}$ forward moving the inclined notch in it opposite a pin in the end of lever $i^{28}$ and this allows the springs $i^{27}$ to raise the projections $i^{25}$ into the course of the travelers and thereby stop them. The ring rail being now raised and caused to traverse by a third heart or cam $h$ on the cam shaft $d$, and the spindles revolving wind the yarn or thread positively on the upper part of the chase of the cops without spinning the faller wires $g^4$ and $g^5$ being drawn down by the yarn or thread. The winding on is continued until the yarn or thread which was drawn off the cops is nearly all wound on. The incline $g^{28}$ attached to the faller arm $g^3$ see Fig. 9 now depresses a stud $i^{32}$ attached to the end of the catch $i^{31}$ lifts this catch and liberates the bar $i^9$. During this time the slide bar $f^4$ has fallen sufficiently to take the lever $i$ from contact with lever $i^{14}$ so that the catch $i^{31}$ being lifted the spring $i^{15}$ causes the bar $i^9$ to be moved to its first position. This motion of the bar $i^9$ causes the slide bar $i^{19}$ to be drawn back and the incline of which acting on the pin in lever $i^{23}$ depresses it thereby moving the projections $i^{25}$ down to their first position and so liberating the travelers.

The mechanism for actuating the projections $i^{25}$ is similar on each side of the spinning frame, the motion of bar $i^9$ being conveyed through rods $i^{11}$, $i^{12}$ and lever $i^{13}$ to bar $i^{10}$. The travelers being liberated they commence rotating, the ring rail having been traversed a sufficient distance from the nose of the cops to insure the travelers having a sufficiently large diameter to enable them to start. The tumbler incline $h^7$ supported by the upper part of $h^2$ allows the lever $g^{21}$ to pass with very little friction, and the lever $g^{21}$ depressing the catch $h^5$ liberates the lever $h^2$ and the spring $h^8$ having been previously compressed now throws the roller clutches $h^9$ and $h^{10}$ into gear thus putting the rollers in motion. The adjustable plate $f^{12}$ attached to the stripping cam $f$ (see Fig. 17) now allows the slide bar $f^4$ to drop. The slide bar $f^4$ is partially balanced by the weight $f^{14}$ supported by a cord passing over the pulley $f^{13}$ and attached to slide bar $f^4$. When the link $f^6$ was disconnected from the stud $g^{22}$ it was thrown back with the stop $f^{10}$ against the slide bar $f^4$ and is in this position when the slide bar $f^4$ is dropping. Just before the finish of the drop of the slide bar $f^4$ the tail $f^{11}$ of the link $f^6$ comes in contact with the spring $f^{15}$ attached to the bracket $f^9$ which causes the link $f^6$ to be thrown forward and engage with the stud $g^{22}$. The slide bar $f^4$ now rests on the adjustable stop $f^{16}$.

The lever $g^{30}$ (see Fig. 11) supported on a faller bearing bracket has weight $g^{29}$ attached to one end and bowl $g^{31}$ at the other. This bowl bears against a segment $g^{32}$ having an incline on it. A little before the finish of the fall of the faller wires the bowl $g^{31}$ acting against the inclined part of the segment $g^{32}$ assists the downward motion of the faller wires, and then keeps them at rest in their first position; also at the finish of the downward motion of the faller wires, the lever $g^{23}$ acting through $g^{24}$ raises the stop $g^{25}$ from the position shown by dotted lines in Fig. 11 to that shown by full lines in order to be in position again to control the height to which the faller wires ascend by their momentum on the next rise of the same.

Just before the third heart or cam $h$ comes into action the bowl $a^2$ pushes the tumbler $a^3$ supported by stud $a^4$ fixed to cam $a'$ from the position shown by dotted lines to that shown by full lines (see Fig. 13). The cam $h$ acting through bowl $h'$ and the builder lever now moves the bowl $a^2$ away from the cam $a'$. This allows the tumbler $a^3$ to fall into the position shown by dotted lines. The operations previously described having taken place the third heart or cam $h$ now comes out of action and allows the bowl $a^2$ to come on to the tumbler $a^3$ the traverse of the ring rail being now continued by the heart or cam $a'$. The hollow $e^{18}$ in cam $e$ (see Figs. 19, 3 and 4) having come opposite bowl $e'$ the weight $e^{19}$ supported by lever $e^{17}$ attached to the strap fork lever $e^2$ causes the driving strap to be moved on to the fast pulley $e^5$. After this motion of the lever $e^2$ the spring $e^{15}$ draws the winding friction clutch $e^3$ out of action.

$c^7$ (see Fig. 3) is an incline and stop attached to the sliding part $c$ of the cam shaft clutch. A little before the cam shaft $d$ has made one revolution the incline on $c^7$ being forced against the lever $b^6$ causes the clutch $c$ to be brought out of gear and compresses the spring $c^2$; $j$ (see Fig. 1) is a stretched spring attached to lever $j'$. The lever $j'$ is supported at end $j^2$ by a stud fixed to the framing the other end acting against the stud $j^3$, fixed in brake cam $d'$, through the cam shaft $d$ forces the stop on $c^7$ against the end of the lever $b^6$ thus stopping the cam shaft $d$ after it has made one complete revolution, and keeping it stationary. The simultaneous spinning and winding on with the ring and traveler is now continued at and near the middle and larger diameters of the chase of the cops and then the additional quantity of yarn or thread is again put on the smaller diameters of the chase of the cops, and this cycle of operations consisting of the second and third parts of the improved process is repeated at each revolution of the hearts or cams $a\,a'$, the yarn or thread being built higher up the spindle each revolution of the said hearts or cams until the cops are completed.

The apparatus for effecting the starting and stopping of this new spinning frame consists of the following parts: (see Figs. 1 and 4.) The shaft $n$ extending across the frame supported by the framing, has the handles $n'$ $n^2$, the lever $n^3$, and the eccentric or cam $n^6$ fixed to it. The lever $n^3$ is connected to bell cranked lever $e^{10}$ by the adjustable chain and link $n^4$. Fig. 4 shows the position of the various parts when the strap is on the loose pulley $k$; when starting the spinning frame by turning the handle $n'$ or $n^2$ the chain $n^4$ allows the weight $e^{16}$ to move the strap fork until the bowl $e'$ comes in contact with the hollow $e^{18}$ in the cam $e$ and is then over the fast pulley $e^5$ and also allows the bell cranked lever $e^{10}$ to drop on to the lever $e^{13}$. When stopping the spinning frame the strap being on pulley $e^5$ the reverse action of the handle causes the chain $n^4$ to lift the lever $e^{10}$ and pull the strap fork over the loose pulley $k$ and at the same time the eccentric or cam $n^6$ forces up the lever $d^5$ fixed to the shaft $d^3$ causing the brake $d^4$ to be applied.

When the spinning frame is being driven by the winding speed friction clutch $e^3$ and it is required to be stopped the same reverse motion of the handle lifts the bell cranked lever $e^{10}$ and liberates the lever $e^{13}$ the spring $e^{15}$ then drawing the winding speed friction clutch $e^3$ out of action and the brake is applied as in the previous cases.

When a set of cops is completed the ring rail is lowered quickly by the ordinary mechanism used for the same in ring frames (not shown in the drawings) and a few coils of yarn are wound during spinning on the upper part of the sleeve of the spindles. The boards to which the guide eyes and hooks $g^6$ are attached are moved sidewise to allow the cops to be doffed. The bowl $a^2$ is moved from heart or cam $a'$ to heart or cam $a$, and the lever $b$ is withdrawn from the path of the stud $b^4$ preparatory to starting a fresh set of cops.

Fig. 23 represents an elevation of the driving arrangements for the new spinning frame. Fixed on the counter shaft $p$ is the pulley $p'$. The pulley $p'$ drives the pulleys $e^5$, and $k$, as required through the driving strap $p^2$. The double grooved pulley $e^4$ is driven by the triple grooved pulley $p^3$ by a continuous band $p^4$ working in the two grooves of pulley $e^4$, the three grooves of pulley $p^3$ and under the stretching pulley $p^5$.

Figure 24:
Figure 25:
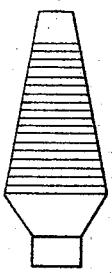

Figs. 24 and 25 show the formation of the cop chase when the ring rail is actuated by the heart or cam $a$ and the horizontal and diagonal lines indicate the distribution of the yarn as it is wound on the chase during simultaneous spinning and winding with the ring and traveler during one revolution of the heart or cam $a$; and also show a suitable size to which the cops should attain before the second and third parts of the improved process are brought into operation.

Figure 26:
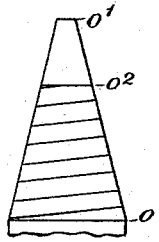
Figure 27:
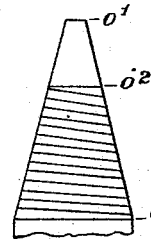
Figure 28:
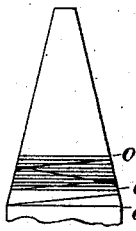

Figs. 26 to 30 represent the distribution of the yarn of the cop chase for one complete cycle of operations of the second and third parts of the improved process. In Fig. 26 the lines between $o$ and $o^2$ represent the yarn put on the chase during simultaneous spinning and winding as the ring rail is traversed from $o$ to $o^2$. Fig. 27 represents the same as the ring rail is traversed from $o^2$ to $o$. Fig. 28 represents the same as the ring rail is traversed from $o$ to $o^3$ and from $o^3$ to $o^4$ and from $o^4$ to $o^3$. This yarn put on between $o^3$ and $o^4$ is the additional quantity of yarn or thread previously referred to.

Figure 29:
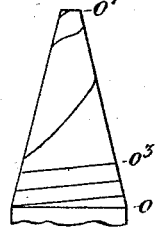
Figure 30:
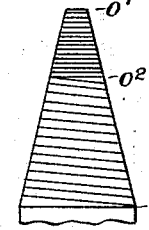

In Fig. 29 the part between $o$ and $o^3$ represents the appearance of the cop chase after the additional quantity of yarn or thread is drawn off, the first coils wound on during positive winding without spinning are represented between $o^3$ and $o'$, the travelers being locked or stopped as the ring rail is ascending and near $o'$, the ring rail being now at the nose of the cop $o'$, positive winding is continued as the ring rail descends from $o'$ to $o^2$ see Fig. 30. At $o^2$ the travelers are liberated and simultaneous spinning and winding on with the ring and traveler again comes into operation and the ring rail continuing its downward traverse from $o^2$ to $o$.

Fig. 31 shows a side elevation of an indicator $q$ for ascertaining the tension of the yarn during stripping and positive winding, and its position on the roller beam which is shown in section. At one end of indicator $q$ there is a hook $q'$ which takes the place of one of the hooks $g^6$ and rests on the guide eye board. At the back of the roller beam the bearing $g^2$ supports the indicator. An arm $q^3$ is fixed to $q$. $q^4$ is a weight which hangs on $q^3$ and may be moved to any part of it. $q^5$ is a staple spanning $q$ to prevent the hook $q'$ being lifted too high. The arm $q^3$ is graduated and the weight $q^4$ being such that when it is in the position shown the indicator is balanced, and as $q^4$ is moved to each of the marks nearer the roller beam a known force applied at $q'$ is required to raise the indicator and thus the pull or strain on the yarn passing under $q'$ may be ascertained either during stripping, or positive winding on. One or more of these indicators may be used on the new spinning frame; or two or more hooks $q'$ may be attached to $q$ taking the place of two or more hooks $g^6$ and thus an average indication may be obtained of the tension of two or more yarns or threads. By the use of this indicator the speed of the spindles may be so adjusted that the tension or strain on the yarn during stripping does not exceed certain limits; and the balance weights $g^{10}$, winding weights $g^{12}$ and relieving weights $g^{14}$ may be so adjusted to give the required tension or strain on the yarn, or thread during positive winding.

We claim as our invention—

1. The herein described improved process of spinning or doubling cotton or other fibrous materials and winding the yarn or thread so spun or doubled on to bare spindles or small tubes in the form of cops, which consists in, first, simultaneously spinning or doubling and winding on yarn or thread at the commencement of the formation of the cops until they have attained a suitable size, secondly, simultaneously spinning or doubling and winding on yarn or thread at and near the medium and larger diameters of the chase of the cops, also simultaneously spinning or doubling and winding on an additional quantity of yarn or thread at the larger diameters of the chase of the cops, and thirdly, arresting the simultaneous spinning or doubling and winding on of the yarn or thread, unwinding or stripping the above mentioned additional quantity of yarn or thread from the larger diameter of the chase of the cops and winding it positively on the upper or smaller parts of the chase of the cops, and repeating the second and third steps until the cop is complete, all substantially as set forth.

2. In an apparatus for spinning or doubling cotton and other fibrous materials and winding the yarn or thread so spun or doubled on to bare spindles or small tubes in the form of cops, the combination with a ring frame having suitable rings, travelers, spindles and means whereby the first portion of the cops may be formed by simultaneous spinning or doubling and winding by the ring and travelers, of means substantially as described, for maintaining the ring rail at the larger diameters of the chase of the cops to put on an additional quantity of yarn or thread, rollers, faller wires and devices for operating the same and the ring rail, whereby a portion of the yarn or thread may be unwound or stripped from the cops, devices for arresting the travelers, for operating the ring rail, and for rewinding the stripped yarn or thread onto the smaller parts of the chase of the cops, all substantially as described.

In testimony whereof we have signed our names to this specification in the presence of subscribing witnesses.

THOMAS SEED.
JAMES SEED.

Witnesses to the signature of Thomas Seed:
SAM BUCKLEY,
GEORGE TAYLOR.

Witnesses to the signature of James Seed:
GEORGE DAVIES,
CHARLES A. DAVIES.